United States Patent [19]
Jungell

[11] 3,804,607
[45] Apr. 16, 1974

[54] MOLDED ABRASIVES WITH A BINDER OF A COPOLYMER OF AN UNSATURATED POLYESTER AND AN ETHYLENICALLY UNSATURATED MONOMER

[75] Inventor: Hans A. Jungell, Bottmingen, Switzerland

[73] Assignee: Esterol AG, Basel, Switzerland

[22] Filed: July 1, 1971

[21] Appl. No.: 159,051

[30] Foreign Application Priority Data
July 2, 1970  Switzerland...................... 10048/70

[52] U.S. Cl.......................... 51/298, 51/295, 260/41
[51] Int. Cl............................................ C08g 51/12
[58] Field of Search ................ 51/298, 295; 260/41

[56] References Cited
UNITED STATES PATENTS

| | | | |
|---|---|---|---|
| 3,540,869 | 11/1970 | Bauer................................... | 51/298 |
| 3,684,466 | 8/1972 | Petrone................................. | 51/298 |

*Primary Examiner*—Donald J. Arnold
*Attorney, Agent, or Firm*—Wenderoth, Lind & Ponack

[57] ABSTRACT

The Production of Abrasive Articles comprising abrasive grains, an organic binder consisting essentially of the copolymerization product of an unsaturated polyester with one or more polymerizable liquid ethylenically unsaturated monomers.

17 Claims, No Drawings

MOLDED ABRASIVES WITH A BINDER OF A COPOLYMER OF AN UNSATURATED POLYESTER AND AN ETHYLENICALLY UNSATURATED MONOMER

The invention relates to a process for manufacturing molded bodies by means of organic binders. In particular, the invention deals with a process for manufacturing abrasive elements wherein the abrasive is bonded by means of a binder that is formed essentially through polymerization of an unsaturated polyester with a copolymerizable, olefinically unsaturated monomer, optionally in the presence of a polyisocyanate.

Developments in the field of synthetic polymeric materials have led to results that are being utilized also by other fields of technology. Thus, articles that were previously manufactured exclusively from inorganic materials, such as tiles, flags, slabs, trays and other articles, are manufactured now from organic raw materials that are being made available by polymer technology.

In the manufacture of abrasive elements, it is known to employ a binder that is formed essentially through the copolymerization of a liquid monomeric ethylene derivative with an unsaturated polyester, optionally in the presence of a polyisocyanate, with the aid of polymerization agents. Until the present time, the procedure in this connection was generally such that the unpolymerized mixture of all the components from which the molded body was to be formed was poured into a mold and then hardened through polymerization. However, this simple method was associated with the disadvantage of a sedimentation in the fluid mixture of the solid abrasives due to their high specific gravity. This produced abrasive elements of irregular density and, consequently, of unsatisfactory mechanical properties. The process was also uneconomical insofar as the mass production of molded bodies, e.g., grinding disks, using liquid casting resins as binders, required a large number of molds, since the hardening of the molded mixture had to be carried out in the mold itself because the mixture, even if compacted, did not keep its shape outside the mold without prior hardening by polymerization.

Accordingly, in order to avoid such disadvantages, the consistency of the mixture was selected such that a pasty to granulous, free-flowing mass was obtained, which mass could be filled homogeneously into the mold without a sedimentation of the solid ingredients in the mixture, compacted into a stable molded body, unmolded thereafter and hardened outside the mold through the polymerization of the binder. In order to obtain such a moldable mixture, it was necessary that the solid components exceeded the liquid components to a considerable extent.

The preparation of such a moldable mixture in the known process was carried out in such a manner that the abrasive was first mixed with a liquid casting resin that consisted of a liquid monomeric derivative of ethylene and an unsaturated polyester dissolved therein. However, in order to give the mass the desired consistency, a large quantity of solid fillers was then worked into the mixture, which produced the desired pasty to granulous, free-flowing consistency of the mass. However, the addition of this relatively large quantity of inert fillers, that react neither with the binder nor with the abrasive, exerts a detrimental effect on the mechanical strength and the resistance to water of the abrasive elements thus produced.

It has now been found that abrasive elements of substantially higher mechanical strength and resistance to water are obtained, if the molded bodies are produced in accordance with the process described hereinafter.

According to the invention, the process for the manufacture of molded bodies, in particular abrasive elements, that contain a polymerized organic binder, is characterized in that in a first stage of the process, the abrasive is first mixed with a liquid component consisting of one or several liquid, polymerizable derivatives of ethylene, polymerization agents and optionally a polyisocyanate; thereafter, in a second stage of the process, the solid unsaturated polyester and the remaining optional components are worked into the mixture. The moldable mixture thus obtained is compacted into a stable casting, which is hardened subsequently through copolymerization of the binder. By stable casting is meant a body which is substantially self-supporting when free-standing and keeps its shape outside the mold before being hardened by polymerization of the binder.

For the feasibility of the process according to the invention, it is absolutely necessary to produce (from the liquid and solid components) a mixture which can be compacted into a stable casting without polymerization. Accordingly, in such a mixture, the portion of solids must be so large in relation to the liquid portion that a separation of the mixture into a liquid phase and a solid phase can no longer occur when the material is left standing. In regard to its consistency, such a mixture may be compared to moist sand as it is required for children playing with toy molds.

In earlier processes, the abrasive was wetted, for practical purposes, with a solution consisting of 60 - 75% unsaturated polyester dissolved in 40 - 25% liquid monomer, i.e., with a so-called liquid casting resin. Thus, a relatively large amount of liquid was added to the abrasive (the dissolving of the polyester in the liquid monomer means a great increase in the amount of liquid). This rendered difficult the preparation of a sufficiently dry, moldable mixture which keeps its shape after compacting. In the first stage of the present process, however, the abrasive is first wetted with a relatively small amount of liquid consisting basically only of the monomer or monomers and, in a following stage of the process, the solid polyester is then admixed in the form of a dry resin. This two-step procedure permits preparation of a granulous, sufficiently dry and free-flowing material that can be compacted into stable bodies, without the necessity required in earlier processes, of adding a large amount of fillers with their detrimental effect on the mechanical strength and the resistance to water of the abrasive bodies.

However, in accordance with a further aspect of this invention, a small portion of the solid polyester may be added already to the liquid monomer. This portion may amount up to 15% by weight of the total required amount of the polyester.

In accordance with another aspect of the invention, one may proceed also in such a manner that the abrasive is first mixed with a small part of the total required amount of the solid polyester and the mixture then wetted with the liquid components.

In both of the above cases, the remainder of the polyester is added to the abrasive only after it is wetted with the liquid components in the following stage of the process.

In the case of abrasive bodies wherein the abrasive is bonded with a synthetic resin binder, it has been observed again and again that the mechanical strength, e.g., tensile strength of rotating grinding disks, is impaired by the effect of water or alkaline cooling liquids. For example, the centrifugal tensile strength of the synthetic-resin-bonded grinding disks that were spun in the wet state after being immersed in water for 24 hours is approximately 30 - 40 percent below the values for dry grinding disks which were not treated with water. This reduction in the tensile strength of the water-treated disks was unexpected inasmuch as the abrasive material itself as well as the individual components of the binder are not susceptible as such to the action of water. The reduction in strength of the wet abrasive bodies is due to the fact that the bond between the abrasive and the binder which is subjected to a certain shrinking during hardening and curing, is not sufficiently tight and firm along the surface of the abrasive particles so that, owing to capillary forces, the water or an alkaline cooling liquid penetrates into the grinding disk, forces its way between the abrasive particles and the binder, and brings about a certain plasticity of the binding resin at the boundary surfaces with the abrasive. This damage to the bonding resin as well as the liquid cushion which forces its way between the resin and the abrasive effect a disintegration of the bond between the abrasive and the binder. The penetrating liquid is not removed completely, even when the grinding disk is rotated rapidly, because the capillary forces are stronger than the centrifugal forces and retain a portion of the liquid in the disk. The sharp-edged abrasive, which is no longer firmly attached to the binder, slides in the binder and causes a bursting of the rotating wet disk already at revolutions which are substantially lower than those obtained in the case of dry disks. A good resistance to water is important, above all, for abrasive bodies such as, for example, grinding disks that are continuously sprayed with a cooling liquid during the grinding and cutting operations.

According to one aspect of the present invention, the bond between the abrasive and the binder can be improved substantially by mixing the abrasive with the binder in the presence of a surface-active bonding agent. Accordingly, the abrasive is covered in a preliminary stage with a surface-active bonding agent or the surface-active bonding agent is added to the liquid components of the binder, such components consisting essentially of the liquid olefinically unsaturated monomer, with or without the addition of a small portion of the unsaturated polyester. Alternatively, the abrasive is pre-treated with a surface-active bonding agent and the whole is mixed subsequently with the liquid binder components. Through the preliminary treatment, the abrasive is coated with a layer of a bonding agent by means of surface-energetic forces, which layer is firmly bonded thereafter to the binder during the polymerization. Due to the adhesive strength of the bond between the abrasive and the bonding agent and between the bonding agent and the binder, the capillary action is eliminated to a considerable extent, so that the penetration of the cooling liquid into the grinding disk, along the boundary surface between the abrasive and the binder, is rendered more difficult with the result that the disk retains its mechanical strength even in the wet state.

In order to reduce even further the moixture content of the moldable material and to facilitate thereby the preparation of a granulous, free-flowing moldable mixture, the wet mixture obtained in such a first stage of the process is mixed, in accordance with a further aspect of the invention, with an adsorbent which binds by adsorption the liquid components, in particular the liquid monomer. Adsorbents which combine a very large inner surface with a very small outer surface (so that the liquid can be bound and stored inside the adsorbent) are particularly advantageous in this connection. After the adsorbent is worked into the material, the mixture is left standing up to 15 minutes so as to give the adsorbent enough time to bind as much liquid as possible. Sufficiently dry masses can be obtained in this manner with the addition of small amounts of an adsorbent. In the following stage of the process, such masses can be mixed homogeneously with the solid resin and the other solid components without the formation of lumps or other forms of agglomeration, filled uniformly into the mold and compacted into a stable molded body. A portion of the adsorbate is set free again from the adsorbent in a later stage of the process through the pressure exerted on the material during compacting so that the molded body is bonded prior to hardening into a stable casting that can be removed from the mold. However, the major portion of the adsorbate is released from the adsorbent only during the polymerization of the binder, through evaporation caused by the temperature increase, and is thus made available for the copolymerization.

The following methods may be employed for working the adsorbent into the material:

The abrasive is wetted at first with the liquid binder component, which component consists of a liquid monomer or monomers or a solution of a small part of the solid polyester in the liquid monomer or monomers, together with polymerization agents and optionally a polyisocyanate. Thereafter, the adsorbent is mixed into the wetted abrasive.

Alternatively, the abrasive, or the mixture of abrasive with some polyester, is mixed initially with the adsorbent and then with the liquid binder component; or the liquid binder component is mixed first with the adsorbent and such a mixture is then mixed with the abrasive or with the mixture of abrasive and polyester; or a mixture of polyester and adsorbent is admixed with the mixture of abrasive and liquid binder component, or a mixture of liquid binder component and abrasive is prepared first and the whole is mixed first with the polyester and then with the adsorbent.

If not already done so, the solid, unsaturated polyester or the remaining portion thereof and the remaining solid components are worked subsequently into the mixture thus obtained. As additional solid components, reactive and/or inert fillers may be worked into such mixtures. Reactive fillers, such as solid polystyrene and/or solid, polyunsaturated polymerizable derivatives of ethylene, such as triallylcyanurate, react in with the binder, thus improving its strength. Inert fillers, such as cryolite, pyrite, flint, powdered quartz and the like, are admixed as inert fillers for the purpose of improving the hardness and consistency. The strength of the molded bodies, in particular of abrasive elements, may be reinforced further by means of glass fibers or fabrics. The glass fibers are admixed in a length of, e.g., 4 – 8 mm. The fabrics are added onto the outer surface of the abrasive bodies or as inserts into the mixture.

Due to the drying effect of the absorbents, the resin and the other solid components can be worked into the material and distributed homogeneously without formation of lumps or other agglomerations which exert a detrimental effect on the homogeneity of the moldable material. This homogeneous distribution of the resin in the moldable material is of utmost importance for attaining a perfect and uniform distribution and hardening of the binder and for coating and connecting all abrasive particles. This benefit provided by the process of the invention, i.e., the possibility of mixing the dry resin and the other solids without formation of lumps or other agglomerations with the moistened abrasive, is an important prerequisite for a perfect, dense and uniform hardening and cross-linking polymerization of the binder and, consequently for a good mechanical strength and water resistance of the abrasive body.

The granulous, free-flowing moldable mass obtained in the second stage of the process may be readily filled into the mold and distributed therein uniformly in the third stage of the process. This is important for producing molded bodies of uniform density and composition, which bodies do not exhibit umbalance, e.g., in the case of grinding disks.

After filling into the mold, the material is compacted either through vibration or by means of pressure. The pressure applicable in this connection are between 15 and 200 atmospheres, depending on the composition and the grain of the moldable material. The pressing of the material from both sides was found to be advantageous for obtaining a homogeneous density. During the pressing operation, a portion of the adsorbate is released from the adsorbent and binds the granular material through surface cohesion into a stable casting, which can be removed from the mold before hardening by polymerization.

The molded body thus obtained is hardened in the fourth stage of the process through polymerization of the binder. This may take place directly in the mold. However, a special advantage of the process of the invention consists in that the stable body can be removed from the mold after compacting and can be hardened outside the mold. Through the heat supplied from the outside as well as through the exothermic reaction heat generated in the molded body, the residual adsorbates are set free from the absorbent and are made available for cross-linking and hardening of the binder. The conditions of temperature and duration applicable during the hardening operation are generally known to those skilled in the art.

For better understanding, the manufacture of molded bodies bonded by synthetic resins in accordance with the process of the invention, there will now be described the manufacture of polyester-bonded abrasive bodies consisting of an abrasive, a liquid, copolymerizable monomeric derivative of ethylene, an unsaturated polyester, an initiator of polymerization, a cross-linking agent, a surface-active bonding agent and an adsorbent. However, the process may be applied in an analogous manner also to the manufacture of other synthetic-resin-bonded molded bodies.

Corundum, silicon carbide and similar materials of suitable hardness are employed as abrasives. They are omitted when synthetic-resin-bonded molded bodies other than abrasive bodies are to be produced.

As derivatives of ethylene capable of copolymerization with the unsaturated polyester, there may be employed, alone or in admixture, olefinic monomers containing one or more double bonds capable of copolymerization, such as styrene, methyl styrene, diallylphthalate, diallylisophthalate, the methyl ester, ethyl ester, propyl ester and butyl ester of acrylic acid and methacrylic acid, vinylmethyl ether, vinyl ether, vinyl chloride, vinylidene chloride, vinylmethyl ketone, vinyl acetate, vinyl toluene, vinyl pyridine, divinyl benzene, diallyl fumarate and the like.

Esters or mixtures of esters that are unsaturated either in the acid or in the alcohol moiety or possess double bonds in both moieties may be employed as unsaturated polyesters. Such esters are generally known. They include oxymonocarboxylic acids and dicarboxylic acids with up to 18 carbon atoms in the chain, with or without double bonds, which are esterified with saturated or unsaturated alcohols, aliphatic as well as aromatic ones, such as in particular the esters of maleic, fumaric, adipic, sebacic, itaconic, phthalic, isophthalic, terephthalic, acrylic and methacryclic acids and/or their anhydrides or derivatives with alcohols such as methyl, ethyl, propyl, butyl, pentyl, hexyl, vinyl, and allyl alcohols, ethylene glycol, butylene glycol, propylene glycol, glycerol, pentaerythritol, bisphenols, dioxydiphenyl propane and the mixtures thereof.

Improved cross-linking of the unsaturated polyester with the copolymerizable monomer is obtained by the use of suitable cross-linking agents such as polyisocyanates, e.g. hexamethylenediisocyanate, toluylene-2,4- and 2,6-diisocyanate, naphthylene-1,5- diisocyanate, triphenylmethane-4,4',4''-triisocyanate and the like.

As surface-active bonding agents, those known materials may be used that reduce the surface tension of a liquid as well as those that improve the adhesion between the abrasive and the synthetic resin binder. Within the scope of the invention, silanes such as vinyl triethoxysilane, methacryl oxypropyltrimethoxysilane and vinyl trimethoxyethoxysilane are particularly preferred as bonding agents. As mentioned above, the silanes may be added directly to the liquid binder component or be applied as a liquid solution on the abrasive or abrasive mixtures in order to improve outstandingly the adhesion of the binder on the abrasive. The application of organic chromium complexes that contain polymerizable groups, such as chromichloride-methacrylates, has proved to be just as advantageous. These materials are obtainable e.g., under the trademark "Volan;" they increase remarkably the adhesion between the abrasive and the organic binder. These complexes are mixed with the abrasive (or abrasive mixtures) in a 0.5 - 5.0 percent aqueous solution; thereafter any excess liquid is separated and the treated material dried at 120° - 140°C.

The adsorbents which may be used in accordance with the invention are, for example, silica gel, silicic acid, metal alumino-silicates, bentonite, zeolite, perlite, kieselguhr and other diatomites, activated carbon and the like.

The agents for polymerization, such as catalysts, accelerators and inhibitors, that are employed for the copolymerization of the monomeric ethylene derivative with the unsaturated polyester, and optionally in combination with a polyisocyanate, are generally known to those skilled in the art. They are selected with respect to the conditions of curing and hardening. For the cold hardening, ketone and acid peroxides may be used as catalysts. They may be combined with accelerators such as metal salts of organic acids, e.g., cobalt naphthenate, or with tertiary aromatic amines, e.g., diethyl aniline. For hot hardening, e.g., cumol hydroperioxide, tert. butylperbenzoate, or benzoyl peroxide are preferably employed as catalysts. Multivalent phenols, such as hydroquinone, may be employed as inhibitors.

It is to be noted in this connection that the term "polymerization" includes polycondensation and polyaddition.

When abrasives bodies are manufactured, about 10 – 25 parts by weight binder are used per 100 parts by weight abrasive, the amount of the binder depending on the grain size of the abrasize particles, the type of the abrasive body to be produced and the quality of the binder. The portion of the adsorbent optionally employed in the binder may amount up to 30 percent, the exact amount of the adsorbent depending on the amount and the type of the liquid binder components and the adsorption power of the adsorbent employed.

The amounts of the components which make up the binder may be within the following ranges:

|  | Parts by weight |
| --- | --- |
| solid unsaturated polyester | 100 |
| liquid ethylenic monomers | 15 – 35 |
| catalyst) | |
| accelerator) | 0.5 – 10 |
| inhibitor) | |
| polyisocyanate | 0 – 20 |
| surface-active bonding agent | 0 – 5 |
| adsorbent | 0 – 50 |

For the preparation of a mixture which results, according to the invention, in a stable casting upon compacting without prior hardening through copolymerization for one part by weight of liquid components, (a) at least 15 parts by weight of solid components are used if the abrasive is taken into consideration, or (b) at least 2 parts by weight of solid components, if the abrasive is not taken into consideration. The upper limit for the solid components in the moldable mixture depends on the type of the unsaturated polyester employed, the monomers and the optional adsorbent; they may be very substantially above the mentioned minimum figures as long as one obtains in the end a moldable mixture that can be compacted to a stable casting without prior polymerization.

The so-called liquid casting resins which have been employed in the earlier processes are not suitable as far as the invention is concerned since they introduce into the moldable mixtures an excessive proportion of liquid components.

The following examples explain the invention; however, they are presented merely for the purpose of demonstration and should in no way restrict the scope or application of this invention.

EXAMPLE 1

1. one hundred parts by weight of corundum are wetted uniformly with 15 parts by weight of a 2 percent aqueous solution of chromichloride-methacrylate, whose pH has been adjusted to 5 – 6. This mixture is then dried at 120°C. The abrasive particles, which are thus coated with a surface-active bonding agent, is wetted uniformly in a mixer with 2.2 parts by weight of diallylphthalate monomer.

2. Subsequently, 8.6 parts by weight of ethyl ester of maleic acid, together with 0.25 parts by weight of a 50 percent benzoyl peroxide catalyst, are worked into the mixture as uniformly as possible. A granulous, free-flowing, homogeneous moldable material is obtained.

3. The granulous mixture thus obtained is filled uniformly into a mold sprayed in advance with a silicone releasing agent and pressed in a piston press that acts from both sides at a pressure of 200 atmospheres for 30 seconds.

4. The molded body, which is stable after pressing, is removed from the mold and hardened in a drying furnace, initially at a temperature of 90°C and, after the exothermic reaction temperature sets in, at 140°C for 3 hours.

EXAMPLE 2

1. One hundred parts by weight of corundum are wetted uniformly in a mixer with 20 parts by weight of a 2 percent solution of vinyl trimethoxysilane, whose pH value has been adjusted to 3.5 – 4, and this mixture is then dried. The corundum, which is thus provided with a surface-active bonding agent, is mixed with 3.5 parts by weight of a mixture consisting of 1.5 parts by weight of styrene, 0.25 parts by weight of a 50 percent benzoyl peroxide catalyst and 1.75 parts by weight of a 75 percent polyisocyanate dissolved in acetyl acetate.

The wetted corundum is mixed with 3 parts by weight of silica gel and is left standing for 15 minutes so that the adsorbent has sufficient time to adsorb the liquid components.

2. Subsequently, 8.6 parts by weight of allyl ester of isophthalic acid are worked into the material as uniformly as possible under continuous mixing. A free-flowing, granulous homogeneous moldable material is obtained.

3. The granulous moldable material is filled uniformly into a mold by vibration, which mold has been sprayed before with a releasing agent.

4. The stable casting is taken out of the mold and hardened in a drying furnace, initially at a temperature of 90°C and, after the reaction temperature of the cataylst is reached, at 130°C for 3 hours.

EXAMPLE 3

1. One hundred parts by weight of corundum are wetted uniformly with 20 parts by weight of a 2 percent solution of methacryl oxypropyltrimethoxysilane, whose pH value has been adjusted to 3.5 – 4. This mixture is then dried. The abrasive, which is thus coated with a surface-acting bonding agent, is wetted uniformly in the mixer with 5.4 parts by weight of a mixture which consists of the following components: 0.3 parts by weight of allyl ester of terephthalic acid, dissolved in 1.35 parts by weight of monostyrene, 1.25 parts by weight of diallyl isophthalate, 0.2 parts by weight of tert. butylperbenzoate and 2.3 parts by weight of 66 percent polyisocyanate dissolved in styrene.

The wetted corundum is mixed in the stirrer with 4 parts by weight of an aluminum silicate and is then left standing for 15 minutes so that the absorbent has time to adsorb the liquid binder components of the mixture.

2. Subsequently, 12 parts by weight of a fumaric acid ester are worked into the material as uniformly as possible. A granulous, free-flowing, homogeneous, readily moldable material is obtained.

3, 4. The further working of the moldable material to produce a stable molded body and the subsequent hardening through copolymerization of the binder is done as described in Example 1.

EXAMPLE 4

1. One hundred parts by weight of silicon carbide are wetted uniformly in the mixer with a mixture of 0.9 parts by weight of styrene, 1.0 parts by weight of diallylphthalate and 0.25 parts by weight of tert. butylperbenzoate.

Thereafter, the wetted abrasive is mixed uniformly in the mixer with 4 parts by weight of bentonite. The mixture is left standing for 15 minutes.

2. Subsequently the mixture is worked homogeneously into 8.6 parts by weight of the vinyl ester of adipic acid.

3. The granulous, free-flowing mass which is obtained is compacted into a stable molded body and is finally hardened, as described in Example 1.

EXAMPLE 5

1. One hundred parts by weight of corundum are wetted uniformly with 20 parts by weight of a 1.5 percent aqueous solution of chromichloride-methacrylate, whose pH is set at 5–6, and this mixture is then dried at 120°C. The abrasive, which is thus coated with a surface-active bonding agent, is wetted in the mixer with 3.15 parts by weight of a solution that consists of 0.75 parts by weight of styrene, 2 parts by weight of diallylphthalate monomer and 0.4 parts by weight of a 50 percent benzoyl peroxide catalyst.

2. The wetted corundum is mixed homogeneously in the stirrer with a mixture of 12 parts by weight of allyl ester of isophthalic acid and 3.5 parts by weight of calcium silicate.

3. The granulous, free-flowing mass thus obtained is filled uniformly into a mold sprayed in advance with a releasing agent and pressed on both sides at 200 atmospheres for 30 seconds.

4. The stable casting is released and is hardened in a drying furnace at 160°C for 3 hours.

I claim:

1. A process for the manufacture of molded articles which contain abrasives in an organic binder, said binder being a thermosetting material formed by the copolymerization of an unsaturated polyester with one or more polymerizable ethylenically unsaturated monomers, which process comprises: mixing abrasives with a liquid binder component comprising essentially one or more liquid polymerizable ethylenically unsaturated monomers, and with an adsorption agent for said liquid binder component, then mixing, as a further binder component, a dry unsaturated polyester into the above mixture, thereafter compacting the resultant mixture into a free-standing stable body, and hardening such body by copolymerization of said binder components.

2. A process as in claim 1 wherein the abrasives are first mixed with said liquid binder component, thereafter mixed with an adsorption agent for said liquid binder component, and then mixed with said polyester.

3. A process as in claim 2 wherein the abrasives are first mixed with said liquid binder component and thereafter mixed with a mixture of an adsorption agent for said liquid binder component and said polyester.

4. A process as in claim 3 wherein the abrasives are first mixed with an adsorbate consisting of said liquid binder component adsorbed on an adsorption agent therefor, and thereafter mixed with said polyester.

5. A process for the manufacture of molded articles which contain abrasives in an organic binder, said binder being a thermosetting material formed by the copolymerization of an unsaturated polyester with one or more polymerizable ethylenically unsaturated monomers, which process comprises: treating the abrasives with a surface-active bonding agent, thereafter mixing the abrasives with a liquid binder component comprising essentially one or more liquid polymerizable ethylenically unsaturated monomers, then mixing, as a further binder component, a dry unsaturated polyester into the above mixture, thereafter compacting the resultant mixture into a free-standing stable body, and hardening such body by copolymerization of said binder components.

6. A process as in claim 5 wherein the surface-active bonding agent is added to the liquid binder component.

7. A process as in claim 5 wherein silanes or chromium-chloride-methacrylate-complexes are employed as the surface-active bonding agents.

8. A process as in claim 6 wherein silanes are employed as the surface-active bonding agents.

9. A process as in claim 1 wherein the organic binder is copolymerized with a cross-linking agent.

10. A process as in claim 5 wherein the organic binder is copolymerized with a cross-linking agent.

11. A process for the manufacture of molded articles which contain abrasives in an organic binder, said binder being a thermosetting material formed by the copolymerization of an unsaturated polyester with one or more polymerizable ethylenically unsaturated monomers, which process comprises: treating the abrasives with a surface-active bonding agent, thereafter mixing the abrasives with a liquid binder component comprising essentially one or more liquid polymerizable ethylenically unsaturated monomers, and with an adsorption agent for said liquid binder component, then mixing, as a further binder component, a dry unsaturated polyester into the above mixture, thereafter compacting the resultant mixture into a free-standing stable body, and hardening such body by copolymerization of said binder components.

12. A process as in claim 11 wherein the surface active bonding agent is added to the liquid binder component.

13. Abrasive articles comprising abrasive grains, an organic binder consisting essentially of the copolymerization product of an unsaturated polyester with one or more polymerizable liquid ethylenically unsaturated monomers, and an adsorbent for said monomers.

14. Abrasive articles comprising abrasive grains, an organic binder consisting essentially of the copolymerization product of an unsaturated polyester with one or more polymerizable liquid ethylenically unsaturated monomers, and a surface-active bonding agent.

15. Abrasive articles comprising abrasive grains, an organic binder consisting essentially of the copolymerization product of an unsaturated polyester with one or more polymerizable liquid ethylenically unsaturated monomers, a surface-active bonding agent, and an adsorbent for said monomers.

16. Abrasive articles comprising abrasive grains, an organic binder consisting essentially of the copolymerization product of an unsaturated polyester with one or more polymerizable, liquid ethylenically unsaturated monomers, a cross-linking agent, and an adsorbent for said monomers.

17. Abrasive articles comprising abrasive grains, an organic binder consisting essentially of the copolymerization product of an unsaturated polyester with one or more polymerizable liquid ethylenically unsaturated monomers, a cross-linking agent, a surface-active bonding agent, and an adsorbent for said monomers.

* * * * *